Figure 1:
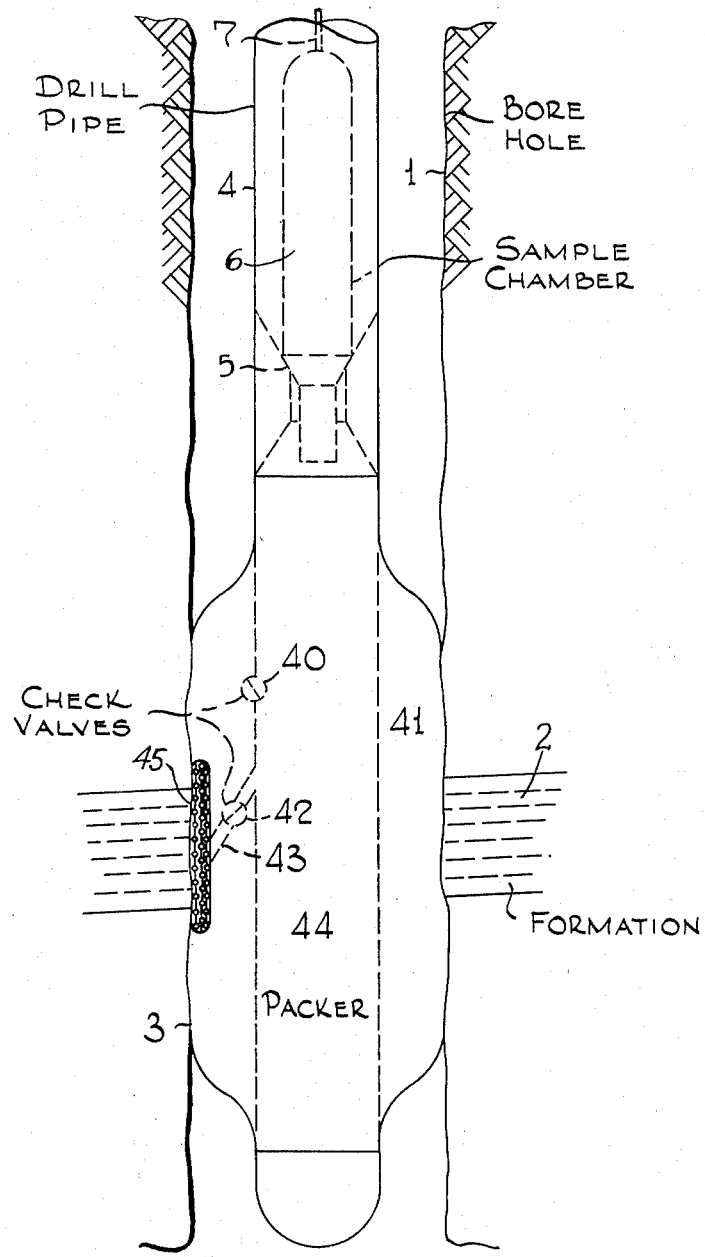

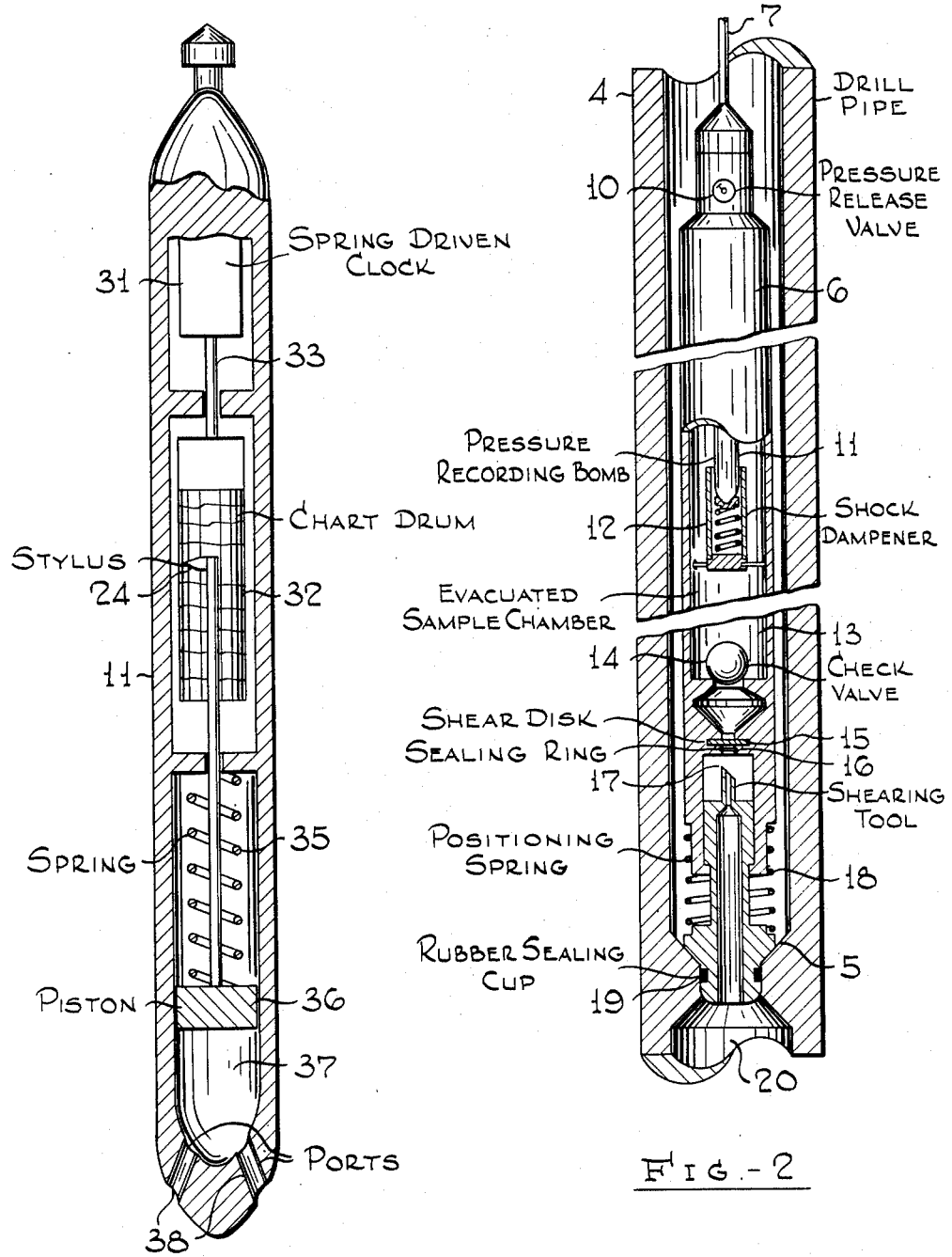

Patented Dec. 30, 1952

2,623,594

UNITED STATES PATENT OFFICE 2,623,594

SAMPLING APPARATUS FOR SUBTERRANEAN FLUIDS

Ben W. Sewell, Tulsa, Okla., assignor to Standard Oil Development Company, a corporation of Delaware Application October 27, 1949, Serial No. 123,864

3 Claims. (Cl. 166—1)

The present invention is concerned with an improved chamber for securing samples of subterranean fluids. The sampling apparatus of the present invention comprises a chamber containing disposed therein pressure recording means for securing an adequate pressure record of the formation at the point the fluid sample is taken.

In prospecting for oil in which a bore hole is drilled into the ground it is often necessary and desirable to test the formations through which the bore hole is being drilled. Various methods and procedures have been employed for doing this. For example, it is well known to use various types of sample chambers and it is also well known to use pressure recording means. However, in the past these chambers and pressure recording means had been employed relatively independent one from the other. It has now been discovered that if a pressure recording means is disposed and utilized within the sample chamber itself distinct unexpected benefits are secured. It is the purpose of this invention to give an indication of the success of a formation test during the test itself, by providing a means of recovering the pressure recorder during the test and while the packer is seated. By incorporating the pressure recorder within the chamber the formation pressure is readily and accurately determined. The fluid is then checked for oil or salt water and the specific properties of each determined. This is done by withdrawing the sample chamber on a wire line while the packer mounted on the drill pipe is still set against the formation adjacent the test area.

If continuation of the test is useless it will be readily apparent and other formations may be tested, while the packer tool is still in the hole. This is accomplished by deflating the packer and moving the drill stem tester to another level in the bore hole. If the sample chamber contains oil, and the pressure recorder chart shows that the packer tool is functioning properly, it may be desirable to continue the formation test and obtain a better indication of the producing properties of the formation.

The present invention may be readily understood by the various figures illustrating embodiments of the same. Figure 1 illustrates a drill stem containing at its lower end an inflatable packer element in a bore hole. Also shown disposed within the drill stem is a suitable wire line pressure recording sample chamber. Figure 2 is a more detailed sketch of the sample chamber shown disposed within the drill stem above the packer. Figure 3 illustrates one suitable type of pressure recorder for installation within the sample chamber.

Referring specifically to Figure 1 bore hole 1 is shown extending below subterranean area 2, which area is to be tested by sealing off the formation from other areas of the bore hole. This is secured by a suitable inflatable packer 3 which seals off the adjoining formations from formation 2. Any suitable type of packer may be employed and any suitable means utilized for permitting fluids contained in area 2 to flow from area 2 into the upper part of the formation tester from where it may be passed into the sample chamber. The packer 3 is shown attached to the lower end of drill stem 4 which contains a shoulder element 5. A sample chamber 6 is shown resting on shoulder 5. This sample chamber may be raised or lowered from the surface by means of a wire line 7 or other suitable means. Packer element 3 is inflated by exerting pressure on the mud column within drill pipe 4 thus opening check valve 40 and inflating outer area 41 of packer 3, causing it to seat adjacent the formation. The pressure is then reduced within the drill pipe, causing check valve 42 to open, thus permitting fluid to flow from formation 2 through packer inlet 45 and conduit 43 to the interior bore 44 of the pipe and thence upward to area 20 of the bore.

Referring specifically to Figure 2 the chamber of the present invention is illustrated. The chamber is raised or lowered within the drill stem 4 by means of wire line 7. Drilling mud is maintained within the area between the sample chamber 6 and the drill pipe 4. The chamber is provided with a suitable release valve 10 for surface use.

In accordance with the present invention a pressure recording bomb 11 is shown disposed with sample chamber 6 adequately supported by a shock dampener 12 or equivalent means. The area 13 within the chamber 6 is adequately evacuated and contains a check valve 14 designed to prevent the outflow of fluid from said chamber. A shear disc 15 and a sealing ring 16 are employed to maintain the vacuum within the chamber until the shear disc is sheared by means of a shearing tool 17, at the point from which it is desired that the sample be taken.

As the sample chamber is lowered within the drill pipe 4, positioning spring 18 guides the sample chamber so that the shoulders of tool 17 seat on shoulders 5 of the drill pipe. A rubber sealing cup 19 is utilized to seal off the drilling mud from the formation fluid which collects in area 20. As the sample chamber is lowered, tool 17 seats as hereinbefore described and shears the shear disc as the sample chamber is further lowered, thus opening the evacuated chamber 13 to area 29 which contains formation fluid.

Referring specifically to Figure 3 details of a satisfactory pressure recording bomb 11 are shown. The bomb contains a suitable spring driven clock 31 which rotates a chart drum 32 by means of shaft 33. A suitable chart is maintained within drum 32 as shown and a stylus 24 records variations in pressure due to a change of position of spring 35 actuated by piston 36 which in turn is actuated by the formation pressure in area 37 transmitted through ports 38, which ports are in communication with the interior of chamber 13.

The sample chamber of the present invention may be utilized in various tests of formation testing, but it is particularly desirable for use in connection with inflatable type packers. Heretofore when pressure recording bombs have been utilized the recording chart would indicate a gradual rise in pressure as the bomb descended into the bore hole which pressure was to a large extent a function of hydrostatic head of the mud. Thus, in every instance, the recording presure bomb would be exposed to the full hydrostatic head of the mud at the point at which it was desired to secure a fluid sample from the formation. Thus as the hydrostatic head of the mud was lowered in order to permit fluid to flow from the formation into the bore hole the recording chart of the bomb would indicate a lowering of the pressure from the hydrostatic head to the formation pressure. If leakage occurred it was not always possible to tell the exact formation pressure. Furthermore, the mud leakage would tend to adulterate the fluid sample.

The sample chamber of the present invention containing the pressure recording bomb disposed therein on the other hand gives an entirely different and more desirable type of chart reading. As the sample chamber is lowered into the hole no change in reading on the pressure recording chart occurs. The sample chamber is properly seated at the point at which it is desired to secure a fluid sample and the shear disc broken by suitable means. Fluid flows from the formation into the sample chamber until a state of equilibrium is attained, thus causing the pressure recording chart to indicate a pressure rise from approximately atmospheric to formation pressure. The bomb will not be required to read the hydrostatic head of the mud unless the sample chamber is not seated properly.

A particular desirable feature of the present invention is that if the valves of the sample chamber do not function properly as the chamber is being lowered in the bore hole to the point at which it is desired to secure the sample, it will be evident from the pressure record. If, for example, the disc should allow drilling mud to seep into the sample chamber during descent the pressure on the recording chart will indicate a gradual increase as the bomb is being lowered.

If a proper seal is not secured the pressure recording chart will indicate a very sudden rise in pressure. On the other hand if a proper seal is secured the pressure recording chart within the sample chamber will rise gradually and will indicate the rate of flow of the formation fluid into the bore hole.

This sample chamber does not have to be evacuated, but may be kept filled with air at atmospheric pressure. The formation pressures encountered are usually so large that this is permissible. The pressure in the sample chamber at the conclusion of the test will be the pressure of the formation or the highest mud hydrostatic head, whichever is the larger. This pressure may be relieved, immediately on recovering the sample chamber, by releasing the compressed air trapped in the upper end. This may be done with a small hand operated valve.

Having described the invention, it is claimed:

1. Improved apparatus for securing fluids from subterranean strata encountered by a bore hole which comprises, in combination, a section of pipe adapted for insertion in said bore hole, an inflatable packer mounted on said pipe and adapted on inflation to seal off a selected formation from fluids in said bore hole, said packer having a fluid inlet adapted to contact said sealed off formation, conduit means connecting said fluid inlet with the interior of said pipe, a constriction in said pipe adjacent said packer, a body adapted to be lowered into said pipe, means for raising and lowering said body in said pipe, a fluid retaining chamber in said body, pressure recording means in said chamber, conduit means connecting to said chamber and terminating at the lower exterior of said body, means initially sealing said chamber from said conduit means, means for opening said sealing means at a predetermined point in said drill pipe, check valve means in said conduit selectively permitting fluid flow into said chamber, and packing means on the lower end of said body surrounding the lower terminus of said conduit means, said packing means being adapted to seat on said constriction upon lowering said body in said pipe.

2. Improved apparatus according to claim 1 wherein said means initially sealing said chamber comprises a rupturable shear disc and wherein said means for opening said sealing means comprises a shearing tool slidably positioned in said body and means moving said shearing tool into rupturing contact with said shear disc upon seating of said packing means on said drill pipe constriction.

3. Improved apparatus according to claim 1 including spring means fastened to said body within said fluid retaining chamber, said pressure recording means being supported by said spring means, whereby said spring means comprises a shock absorbing mechanism for said recording means.

BEN W. SEWELL.

REFERENCES CITED

The following references are of record in the file of this patent:

UNITED STATES PATENTS

| Number | Name | Date |
|---|---|---|
| 1,898,473 | Williston et al. | Feb. 21, 1933 |
| 2,171,000 | Iden | Aug. 29, 1939 |
| 2,189,919 | Moore | Feb. 13, 1940 |
| 2,219,512 | Cooper et al. | Oct. 29, 1940 |
| 2,441,894 | Mennecier | May 18, 1949 |
| 2,497,185 | Reistle, Jr. | Feb. 14, 1950 |
| 2,511,759 | Williams | June 13, 1950 |